No. 876,068. PATENTED JAN. 7, 1908.
C. H. LAU.
RIVET CUTTER AND PUNCH.
APPLICATION FILED JUNE 4, 1907.
5 SHEETS—SHEET 1.
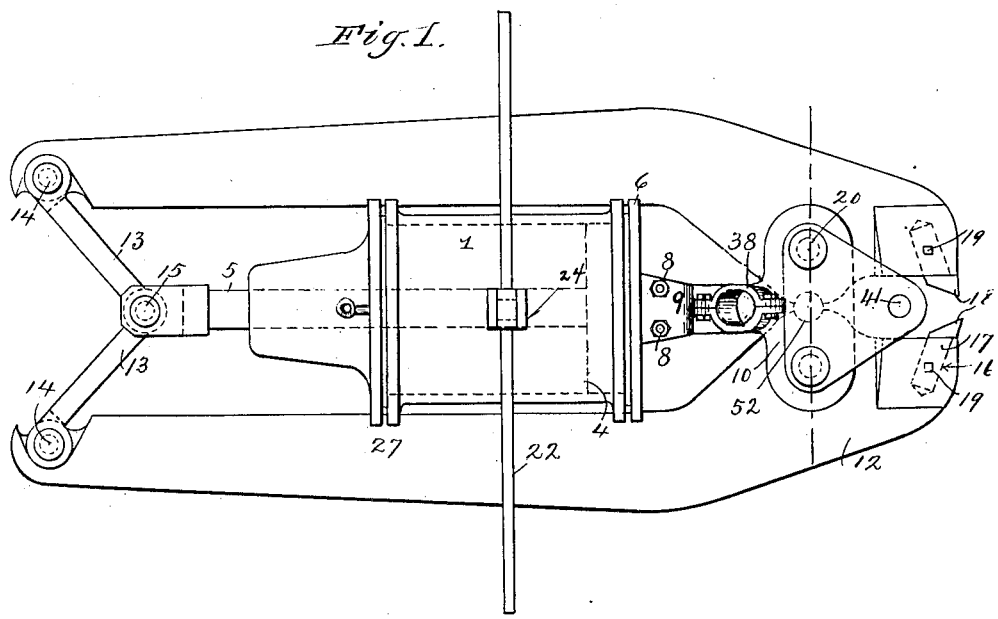
Fig. 1.
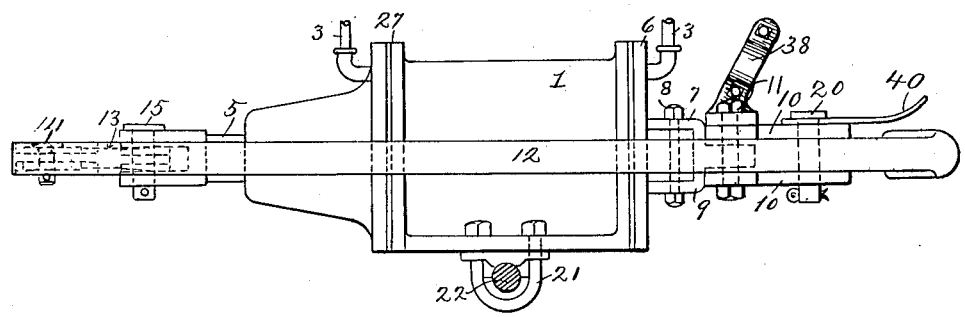
Fig. 2.
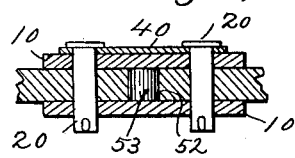
Fig. 1.ª
Witnesses.
Inventor
Conrad H. Lau No. 876,068. PATENTED JAN. 7, 1908.
C. H. LAU.
RIVET CUTTER AND PUNCH.
APPLICATION FILED JUNE 4, 1907.
5 SHEETS—SHEET 2.
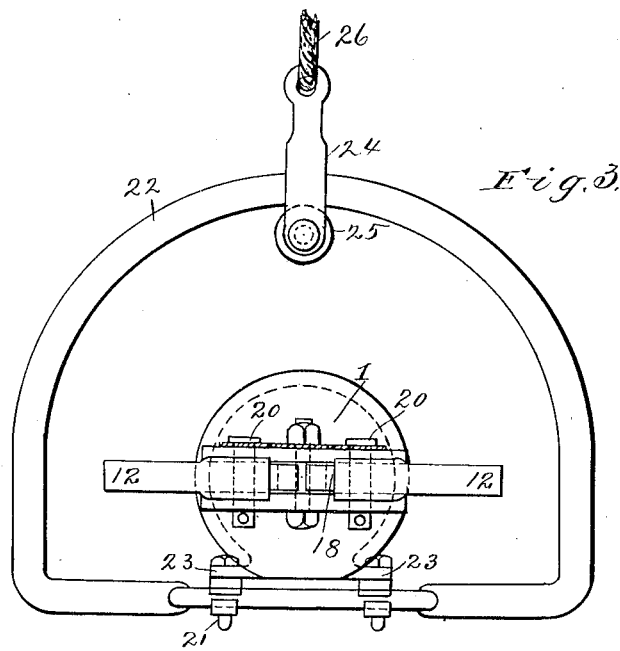
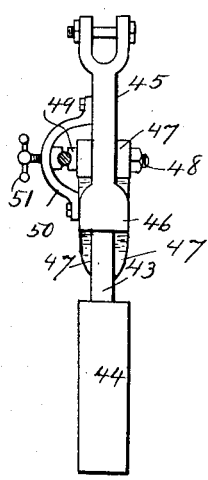
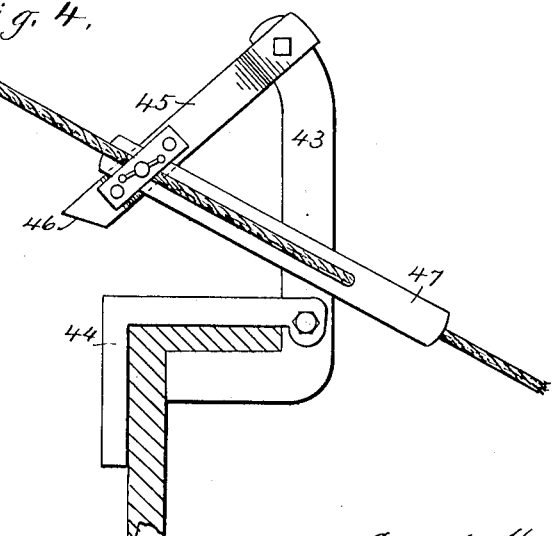

No. 876,068. PATENTED JAN. 7, 1908.
C. H. LAU.
RIVET CUTTER AND PUNCH.
APPLICATION FILED JUNE 4, 1907.
5 SHEETS—SHEET 3.
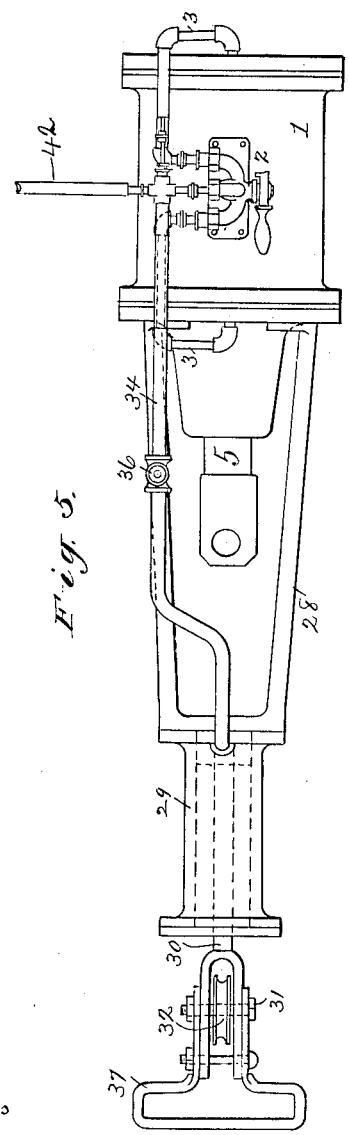
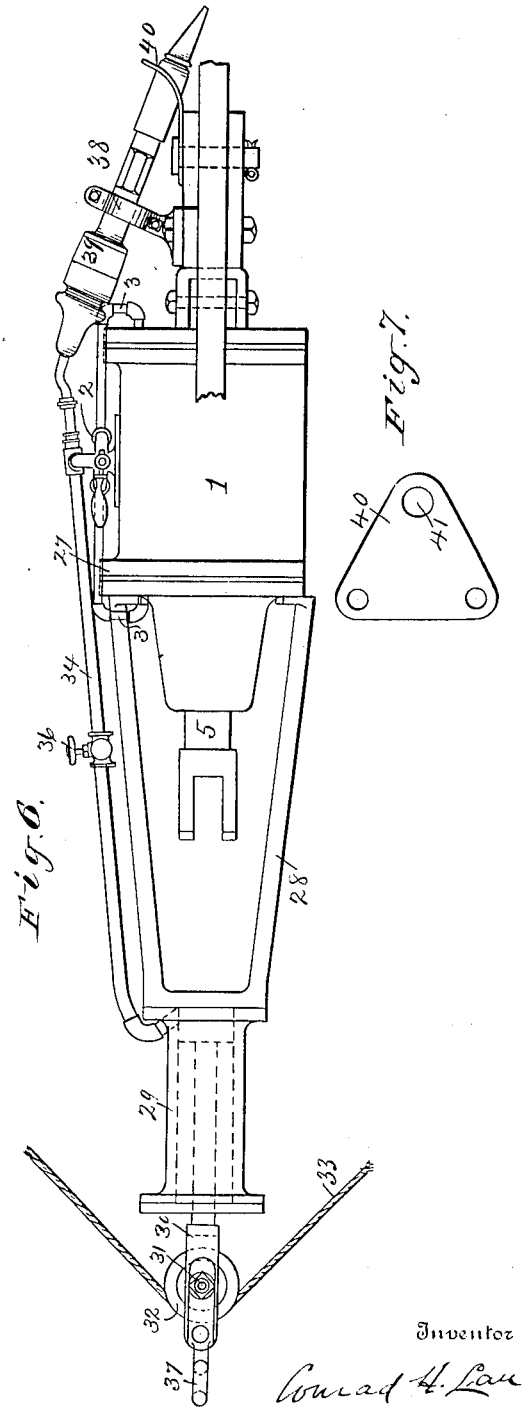
Witnesses
Wilfred E. Lawson
Herbert A. Carlton
Inventor
Conrad H. Lau
by
Frank S. Appleman
Attorney

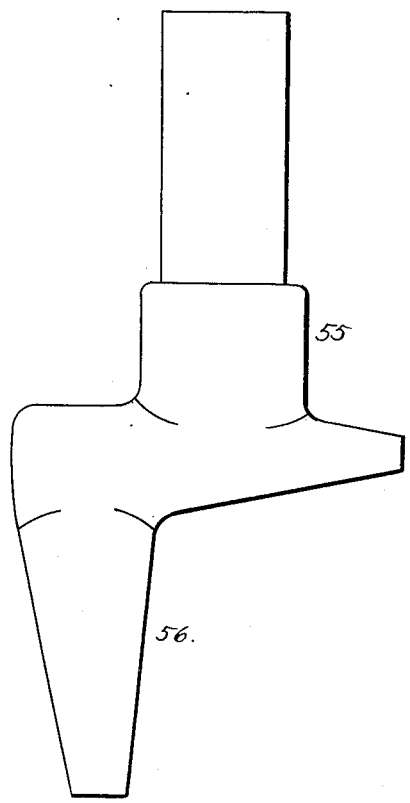
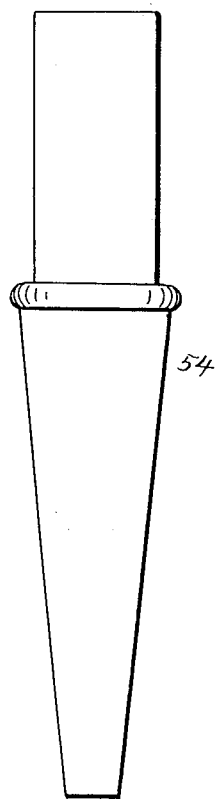
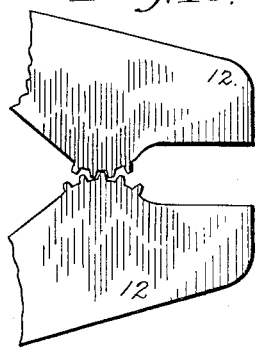

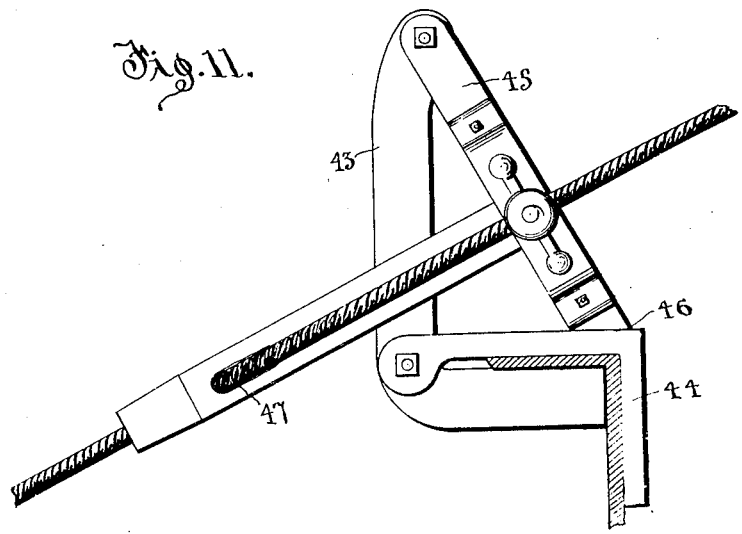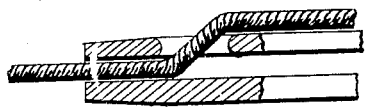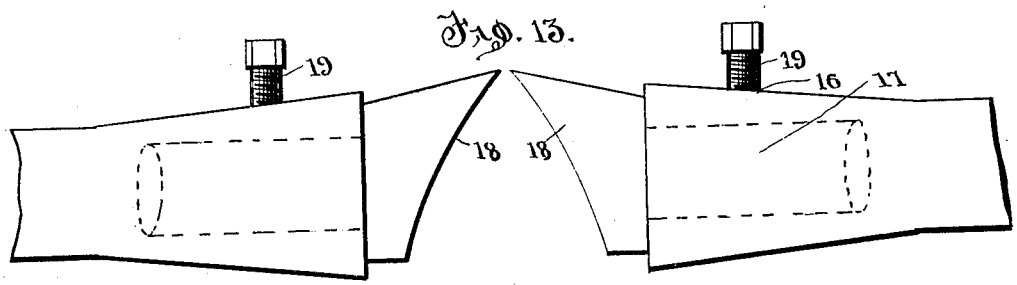

UNITED STATES PATENT OFFICE.

CONRAD H. LAU, OF RENOVA, PENNSYLVANIA, ASSIGNOR OF ONE-FOURTH TO HERBERT A. CARLTON, OF HARRISBURG, PENNSYLVANIA.

RIVET-CUTTER AND PUNCH.

No. 876,068.　　　　Specification of Letters Patent.　　　　Patented Jan. 7, 1908.

Application filed June 4, 1907. Serial No. 377,192.

*To all whom it may concern:*

Be it known that I, CONRAD H. LAU, citizen of the United States of America, residing at Renova, in the county of Clinton and State of Pennsylvania, have invented certain new and useful Improvements in Rivet-Cutters and Punches, of which the following is a specification.

This invention relates to new and useful improvements in rivet cutters and punches and has relation more particularly to that class of machines employed in construction of a steel car, although of course it is to be understood that it can be employed for any purpose for which it is applicable.

It is an object of the invention to provide a novel device of this character which is operated by a fluid means, said fluid means controlling two cutters movable one with relation to the other.

It is also an object of this invention to provide a novel arrangement in a device of this kind whereby the operator is protected from the flying of any of the rivet heads when cutting.

It is also an object of this invention to provide novel means in a device of this character whereby the machine may be adjusted in its positions, either horizontal, vertical or on an angle of 45°.

The invention also has for an object to provide novel means whereby the machine is forced or held against its work when it is desired to obtain a cut.

Furthermore, it is an object of this invention to provide a novel arrangement whereby the means for forcing the machine in contact with its work would be operated simultaneously with the operation of the cutters.

Furthermore, the invention has for an object to provide a novel bracing means to be employed in conjunction with the machine.

A further object of the invention is to provide in a device of the character described, a cutting mechanism, a work engaging mechanism and an ejecting mechanism, all operating by fluid pressure and controlled by a single valve.

Finally, an object of the invention is to provide a novel device of the character noted, which will possess advantages in points of simplicity, efficiency and durability, proving at the same time comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a top plan view of the invention with parts omitted. Fig. 1ª, is a sectional view taken on the line indicated in Fig. 1. Fig. 2, is a side elevation, partly in section with parts omitted. Fig. 3, is a view in front elevation, partly in section of the invention with parts omitted. Fig. 4, is a detail view of a clamp employed in the invention. Fig. 4ª, is a view in front elevation of the clamp. Fig. 5, is a view in top plan with parts of the invention omitted. Fig. 6, is a view in side elevation with parts omitted. Fig. 7, is a detail view. Fig. 8, is a view in elevation of one form of punch employed in conjunction with this invention. Fig. 9, illustrates a second form of punch. Fig. 10, is a detail view of a modified form. Fig. 11, is a detail view in elevation of the clamping means, said clamping means being shown in operative position. Fig. 12, is a detail sectional view of the clamp. Fig. 13, is an enlarged detail view of the cutters said cutters being shown in position at right angles to that shown in Fig. 1.

In the drawings 1, denotes a cylinder of any desired size or form, but preferably a 10″ cylinder, which is in communication with the three-way valve 2, through the medium of the pipes 3. Operated within the cylinder 1, is the piston head 4, provided with the rod 5, which projects rearwardly of the cylinder.

Formed with the front head 6, of the cylinder is a lug or protuberation 7, which is arranged approximately centrally of said head 6. To this lug 7, is fastened by means of the bolts 8, a bracket 9, which has secured on both sides the plates 10. These plates 10, are approximately T-shaped and the stems thereof are secured to the bracket by the bolt 11, which passes through said stems and bracket.

Between the plates 10, and adjacent the ends of the heads thereof are fulcrumed the cutter arms 12, which extend beyond the rear of the cylinder 1, and have pivoted at their rear ends the short arms 13, which are also pivoted to the piston rod 5, through the medium of the bolts 14 and 15, respectively. The opposite ends of the cutter arms 12, extend in advance of the plates 10, and their opposed walls are provided with sockets 16, which are engaged by the shanks 17, of the cutters 18. The shanks 17, are held within the sockets 16, by the clamping screws 19.

While for convenience of illustration, the cutters 18, have been shown as cutting from the front of the arm, it is to be stated that these cutters can be employed with equal facility if adjusted to cut from the top of the arms or from below the arms. To accomplish this, the shape of the cutters and the adjustment in the cutter sockets will be made accordingly.

It is believed that from the foregoing description it is clearly apparent that when the piston rod 5, is forced downward, this movement of the rod through the medium of the short arms 13, will rock the cutting arms 12, on their pivots 20, with sufficient force as to cause the cutters 18, to clip the heads of the rivets when the machine is in applied or operative position.

Held to the under surface of the cylinder 1, by the clamps 21, is a bail 22, which is approximately semi-circular in form and it is the flattened or straight portion that is engaged by the clamps 21. Said clamps, it may be stated, also engage the lugs 23, on the under surface of the cylinder. It is also to be observed that the cylinder 1, is within the bail and approximately centrally of the straight portion.

Movable on the bail 22, is a sheave 24, which is provided with a roller 25, which engages the under surface of the bail 22. It is through the medium of this sheave 24, and bail 22, that the cylinder 1, or the machine is held in its operative position. The sheave 24, is adapted to be engaged by a flexible connection 26, which operates in conjunction with a crane or other hoisting mechanism (not shown). By this arrangement the machine can be elevated or lowered to any desired position. It is also often desired and required that the angle of the cutters with relation to the rivet to be cut be changed. This is easily effected by moving the bail 22, in the desired direction through the sheave 24.

Projecting from the rear head 27, of the cylinder 1, is the bracket 28. This bracket is of sufficient length as to project beyond the end of the cutter arms 12, and their intimate parts. Carried by the end of this bracket 28, is a small cylinder 29, which operates the piston 30. This piston has its outer end 31, bifurcated and within this bifurcation is mounted on the bolt or shaft 31, a pulley 32. This pulley 32, is engaged by a cable 33, which is fastened to the top and bottom of the car on which the machine is to be employed.

The cylinder 29, is in communication with the supply pipe 42 and the passage of the fluid through this pipe 34, is controlled by the valve 36. When the fluid is admitted within the cylinder 29, the machine or the cutters will be forced against the car and facilitate the cutting operation. It is thought to be obvious how this force is obtained as the cable 33, is of such a character as not to give under the pressure exerted thereon.

The cable 33, may be clamped to the car in any desired manner but it has been found preferable to employ the form of clamp as illustrated in Fig. 4, of the drawings. In this form of clamp an approximately L-shaped body 43, has pivoted near its foot an approximately L-shaped clamping lever 44, the free edge of the foot of the body 43, contacting with the interior face or surface of the car at the top while the foot of the clamping lever contacts with the exterior surface of the car, the car being indicated in section in Fig. 4. Adjacent the top of the body 43, is pivoted a straight lever 45, having its lower or free end 46, inclined or beveled to contact with the stem of the clamping lever 44. Straddling the stem of the body 43, is a fork 47, which is pivoted near its free ends to the lever 45, by a bolt 48, which passes through both members of the fork and the lever. The head 49, of the bolt acts as a clamping member as will be hereinafter referred to. Carried by the lever 45, is a bracket 50, which extends over one of the members of the fork 47, and this bracket is provided with a clamping screw 51, which acts in conjunction with the head 49. The head of the fork is provided with a passageway which terminates at one side of the fork adjacent the base of one of the members and through this passageway passes the cable or rod 33, hereinbefore referred to. This cable is placed between the head 49, and the clamping screw 51. When pressure is exerted on the piston within the cylinder 29, and the rod 30, extended, this movement will pull or stretch the cable and this movement of the cable will pull or force the lever 45, in contact with the clamping arm 44, and thereby hold the clamping member 35, to the car, and it is to be observed that the greater the pressure on the cable 33, the more efficient the clamp. It is also to be stated that it is essential that the cable 33, pass centrally of the fork so that the cable 33, may be held in proper position with relation to the machine proper, as is shown in detail Fig. 12.

The free end of the piston 30, has clamped thereto a hand hold 37, which in practice has been found desirable, as it presents a means for the operator to move the machine as may be desired. It may also be stated that the cable 33, could be dispensed with and this hand hold 37 of the piston be brought in contact with any stationary body possessing sufficient resistance.

Projecting upward from the stem of the upper plate 10, on a forward incline and held to the stem by the bolt 11, hereinbefore referred to is a clamp 38, which holds in position a fluid operated hammer 39, which is in communication with the supply pipe 42, hereinbefore referred to. This hammer may be of any ordinary or desired construction, but it has been found preferable to employ the form of punches shown in Figs. 8 and 9. In Fig. 9, is shown a straight tapered punch 54, while in Fig. 8, is illustrated a punch 55, approximately T-shaped having projecting forwardly from one of the ends of the head the tapered extension 56. This latter form of punch is to be employed when it is desired to eject rivets directly in front of or in alinement with the cutters 18.

When the valve 2, is turned to retract the piston rod 5, the hammer 39, is made operative in the well known manner and this hammer is so positioned as to contact with the rivet that has been headed to force or eject the same. Held by the pivots 20, and the upper plate 10, is a guard plate 40, which extends on an incline over the cutters 18, and is intended to prevent any of the heads that may be cut from flying into contact with the operator. This plate 40, is provided with an aperture 41, through which extends the hammer 39.

It has been previously stated that the cutters 18 are adjustable within their sockets. This adjustment is permissible in view of the fact that the shanks 16, are cylindrical and thereby permit the cutters 18, to be turned to any desired angle with relation to the arms 12, shown in detail Fig. 13. While under certain conditions, it may be necessary to slightly change the specific form of cutters proper, it is not, however, believed necessary to illustrate these forms, as they will depend upon the requirements of practice.

In order that there may be no lost motion of the arms 12, in their movement upon their pivots, the opposed semi-circular recesses 52, are formed in the opposite edges of the arms 12, and tightly fitting within these recesses is the cylindrical roller 53. This roller 53 has been found in practice most essential and will not in any way interfere with the operation or movement of the arms 12, on their pivots. While the employment of this roller 53, is the desired or preferred form, the opposed edges of the arms 12, may be toothed or milled to intermesh as is shown in the modified form Fig. 10. It has also been found in practice that the roller 53, prevents any longitudinal movement of either of the arms 12, with relation to the other and thereby maintains the cutting edge of the cutters 118, in their proper operative relation.

What I claim is:

1. In combination with a cylinder and its piston rod, arms pivotally held by the cylinder projecting beyond the ends thereof, cutters carried by the forward ends of the arms and connections between the rearward ends of the arms and the piston rod whereby movement of the piston rod imparts movement to the arms.

2. In combination with a cylinder and its piston rod, arms pivotally held by the cylinder projecting beyond the ends thereof, cutters carried by the forward ends of the arms, connections between the rearward ends of the arms and the piston rod whereby movement of the piston rod imparts movement to the arms, and means for suspending the cylinder.

3. In combination with a cylinder and its piston rod means for supporting the cylinder, arms pivotally held by the cylinder and projecting beyond both ends thereof, cutters carried by the forward ends of the arms, connections between the rearward ends of the arms and the piston rod whereby movement of the piston rod imparts movement to the arms, and means for moving the cylinder on its support.

4. In combination with a cylinder and its piston rod, arms pivotally held by the cylinder projecting beyond the ends thereof, cutters carried by the forward ends of the arms, connections between the rearward ends of the arms and the piston rod whereby movement of the piston rod imparts movement to the arms, a bail carried by the cylinder, and means engaging the bail for supporting the cylinder.

5. In combination with a cylinder and its piston rod, arms pivotally held by the cylinder, cutters carried by the arms, connections between the arms and the piston rod whereby movement of the piston rod imparts movement to the arms, a bail carried by the cylinder, and a sheave engaging the bail for supporting the cylinder.

6. In combination with a cylinder and its piston rod, a lug on the closed end of the cylinder, pivoted arms carried by the lug projecting beyond the ends of the cylinder, cutters on the forward ends of the arms, and connections between the rearward ends of the arms and the piston rod whereby a movement of the rod will impart movement to the arms.

7. In combination with a cylinder and its piston rod, a lug on the closed end of the cylinder, a bracket secured to the lug, arms pivotally carried by the bracket projecting beyond the ends of the cylinder, cutters carried by the forward ends of the arms, and connections between the rearward ends of the arms and the piston rod whereby movement of the piston rod imparts movement to the arms.

8. In combination with a cylinder and its piston rod, a lug on the closed end of the cylinder, a bracket secured to the lug, plates secured to the opposite faces of the bracket, arms pivotally held between the plates, cutters on the arms, and connections between the arms and the piston rod whereby movement of the piston rod imparts movement to the arms.

9. In combination, a cylinder, a cutting means made operative thereby, and a clamping means made operative by the cylinder.

10. In combination with a cylinder and its piston rod, cutting means carried by the cylinder operated by the piston rod, a second cylinder carried by the first named cylinder, and a piston rod operative within the second named cylinder and projecting therefrom.

11. In combination with a cylinder and its piston rod, cutting means carried by the cylinder operated by the piston rod a second cylinder carried by the first named cylinder, a piston rod operative within the second named cylinder and projecting therefrom, and a roller carried by the piston rod of the second named cylinder.

12. In combination with a cylinder and its piston rod, cutting means carried by the cylinder operated by the piston rod, a second cylinder carried by the first named cylinder, a piston rod operative within the second named cylinder and projecting therefrom, and a hand grasp carried by the piston rod of the second named cylinder.

13. In combination with a cylinder and its piston rod, arms pivotally held by the cylinder, cutters carried by the arms, connections between the arms and the piston rod whereby movement of the piston rod imparts movement to the arms and a guard plate arranged adjacent the cutters.

14. In combination with a cylinder and its piston rod, a lug on the closed end of the cylinder, a bracket secured to the lug, plates secured to the opposite faces of the bracket, arms pivotally held between the plates, cutters on the arms, connections between the arms and the piston rod, whereby movement of the piston rod imparts movement to the arms, and a guard plate secured to one of the plates adjacent the cutters.

15. In combination with a cylinder and its piston rod, arms pivoted one with relation to the other, cutters carried by the arms, connections between the arms and the piston rod, whereby movement of the piston rod imparts movement to the arms, and a guard arranged adjacent the cutters.

16. In combination with a cylinder, cutting means made operative by the cylinder, a second cylinder carried by the first named cylinder, and a piston rod operative within the second named cylinder and projecting therefrom.

17. In combination, a cylinder, a cutting means made operative thereby, means for imparting movement to the cylinder, and a clamping means made operative by a movement of the cylinder.

18. In combination with a cylinder and its piston rod, cutting means carried by the cylinder operated by the piston rod, a second cylinder carried by the first named cylinder, a piston rod operative within the second named cylinder and projecting therefrom, and a clamping means made operative by a movement of the second named piston rod.

19. In combination with a cylinder and its piston rod, arms pivotally held by the cylinder, means for preventing any longitudinal movement of one of the arms independent of the other, connections between the arms and the piston rod whereby the movement of the piston rod imparts movement to the arm, a bail carried by the cylinder, and a sheave engaging the bail for supporting the cylinder.

20. In combination with a cylinder, cutting means made operative by the cylinder, a second cylinder carried by the first named cylinder and positioned to the rear thereof, and a piston rod operative within the second named cylinder and projecting therefrom.

21. In combination with a cylinder, cutting means made operative by the cylinder, a bracket carried by the cylinder, a second cylinder carried by the bracket, and a piston rod operative within the second named cylinder and projecting therefrom.

22. In combination with a cylinder, cutting means made operative by the cylinder, a second cylinder carried by the first named cylinder, a piston rod operative within the second named cylinder and projecting therefrom, a clamping means, and a flexible means engaging the clamping means contacted with by the second named piston rod.

23. In combination with a cylinder, cutting means made operative by the cylinder, a second cylinder carried by the first named cylinder, a piston rod operative within the second named cylinder and projecting therefrom, a roller carried by the piston rod of the second named cylinder, and a hand grasp carried by the piston rod of the second named cylinder adjacent the roller.

In testimony whereof I affix my signature in the presence of two witnesses.

CONRAD H. LAU.

Witnesses:
HERBERT A. CARLTON,
WILFRED E. LAWSON.